(12) United States Patent
Lutzka et al.

(10) Patent No.: US 7,270,375 B2
(45) Date of Patent: Sep. 18, 2007

(54) PUSH/PULL DISENGAGE MECHANISM FOR USE WITH A REAR ROW SEAT FOR SELECTIVE SEAT TUMBLE OR REMOVAL FROM A VEHICLE

(75) Inventors: Tavis S. Lutzka, Clawson, MI (US); Keith Brantley, Utica, MI (US)

(73) Assignee: BAE Industries, Inc., Centerline, MI (US)

( * ) Notice: Subject to any disclaimer, the term of this patent is extended or adjusted under 35 U.S.C. 154(b) by 228 days.

(21) Appl. No.: 11/124,698

(22) Filed: May 9, 2005

(65) Prior Publication Data

US 2006/0249972 A1    Nov. 9, 2006

(51) Int. Cl.
  *A47C 1/00* (2006.01)
(52) U.S. Cl. ............ 297/331; 297/378.12; 297/378.13; 297/378.14; 297/344.1
(58) Field of Classification Search ................ 297/331, 297/335, 336, 378.12, 378.13, 378.14, 344.1, 297/340; 296/65.09, 65.05
See application file for complete search history.

(56) References Cited

U.S. PATENT DOCUMENTS

| | | | | |
|---|---|---|---|---|
| 4,438,895 A | | 3/1984 | Rees .......................... 248/396 |
| 4,484,776 A | * | 11/1984 | Gokimoto et al. ........ 296/65.09 |
| 4,627,656 A | * | 12/1986 | Gokimoto et al. ........ 296/65.09 |
| 5,791,703 A | | 8/1998 | Kritzler et al. ........... 292/336.3 |
| 5,806,151 A | | 9/1998 | Uchiyama ................... 24/418 |
| 6,174,017 B1 | * | 1/2001 | Salani et al. ............. 296/65.03 |
| 6,183,032 B1 | * | 2/2001 | Champ .................... 296/65.03 |
| 6,345,856 B1 | * | 2/2002 | Minai ....................... 296/65.03 |
| 6,520,581 B1 | * | 2/2003 | Tame ......................... 297/336 |
| 6,523,899 B1 | * | 2/2003 | Tame ......................... 297/331 |
| 7,000,990 B1 | * | 2/2006 | Liu et al. .................... 297/336 |
| 2001/0030456 A1 | | 10/2001 | Biletskiy ............... 297/378.12 |

FOREIGN PATENT DOCUMENTS

| JP | 02095991 A | 4/1990 |
|---|---|---|
| JP | 2004058928 | 2/2004 |
| JP | WO 2004/108471 A1 | 12/2004 |

* cited by examiner

*Primary Examiner*—David Dunn
*Assistant Examiner*—Erika Garrett
(74) *Attorney, Agent, or Firm*—Gifford, Krass, Sprinkle, Anderson & Citkowski, P.C.

(57) ABSTRACT

A disengage mechanism incorporated into a floor-mounted, forwardly pivotal and removable seat including a bottom and a pivotally associated back. The mechanism includes a handle-operated actuating assembly mounted to an underside of the seat bottom. A seat forward tumble mechanism includes a cable securing to the assembly at a first location and a seat disengage mechanism includes a pair of cables securing to the assembly at a second location. The assembly is actuated in a first selected direction to engage the forward tumble mechanism, the assembly being actuated in a second reverse direction to concurrently engage the forward tumble mechanism as well as the seat disengagement mechanism.

18 Claims, 4 Drawing Sheets

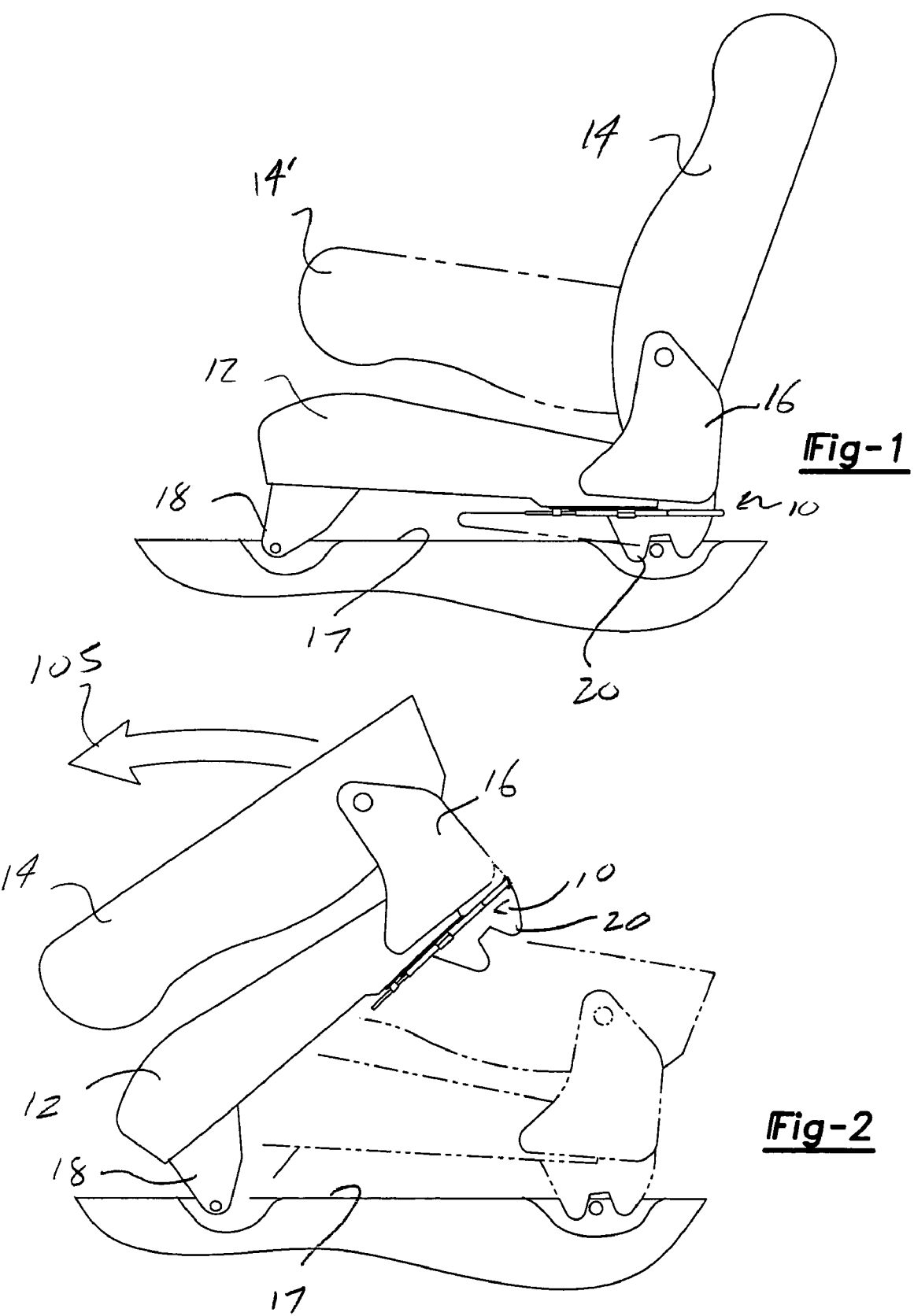

PUSH/PULL DISENGAGE MECHANISM FOR USE WITH A REAR ROW SEAT FOR SELECTIVE SEAT TUMBLE OR REMOVAL FROM A VEHICLE

BACKGROUND OF THE INVENTION

1. Field of the Invention

The present invention relates generally to seatback release or removal mechanisms. More specifically, the present invention discloses a push/pull mechanism incorporated into a rear row seat and which facilitates selective forward tumble and/or removal of the seat from within a vehicle.

2. Description of the Prior Art

The prior art is well documented with varying examples of seat tumble and release mechanisms. Uchiyama, U.S. Pat. No. 5,806,151, illustrates a lock slider for a slide fastener incorporated into an operating-lever receiving seat. Locking and unlocking is accomplished by turning an operating lever under the resiliency of a resilient plate.

U.S. Pat. No. 5,791,703, issued to Kritzler, teaches an actuating handle for a motor-vehicle door latch and in which a handle extends longitudinally on an outside of the panel and has one end coupled to the latch and another end projecting through the panel and provided with a fork having a longitudinally open seat. A backing plate on an inside of the panel is provided with a transversely extending pivot bar engaged in the seat of the fork. The handle is pivotal about an axis of the bar between a rest position relatively close to the door and an outer actuated position pulled out from the door. Interengaging formations on the bar and in the seat block longitudinal displacement of the handle relative to the backing plate except in the rest position of the handle so that when the handle is moved to or beyond the outer actuated position the formations prevent removal of the handle from the door.

Rees, U.S. Pat. No. 4,438,895, discloses a vertical seat adjuster incorporating, in relevant part, a seat support bracket fixed to the seat and having front and rear arcuate slots. Front and rear levers are pivotally mounted on the vehicle and pivotally secured to the seat support bracket. A lock plate for each lever is slidably mounted on the bracket for movement between an engaged position wherein it engages the pivot means projecting through the slot of the seat support bracket to lock the bracket in a vertical adjusted position. A release position permits the bracket to be movable relative to the pivot means upon rotation of the lever. A manually operable release mechanism selectively and alternately moves the lock plates to a released position and such that the plates are biased to an engaged position.

Japanese Publication 02095991 teaches a forward tumble motorcycle seat including a rectangular plate welded to a body side member of a hinge mounted at the front of the seat slidably detained with a rail plate installed on a rear top of the body. Holes are formed in the plate through which is fitted a pin of a lock lever device. A rectangular slide plate is welded to the bottom of a detent member of a rotation locking device to be detained with a detent groove in a rail plate mounted on the rear top of the body so as to slide in the direction fore and aft. Upon the lever being turned to remove the pin from the associated hole, the seat is permitted to be slid freely fore and aft.

Finally, the WIPO 2004/108471 publication teaches a tip up/slide type car seat with an interlock mechanism, wherein unless a seat cushion is tilted by a tip-up mechanism, a limiting lever is kept unswingably by the pressing of an operation plate by the retaining pin and brought in a state of allowed to abut on a stopper plate. When the seat cushion is tilted by the tip-up mechanism, the guide pin of a flap arm rotates a cam plate which in turn pulls an associated rod, in turn swinging the operation plate. The plate releases the pressing of the limiting lever by the retaining pin and the lever is brought into a state whereby it is allowed to ride on the stopper plate, permitting the seat to be moved to a specified position.

SUMMARY OF THE PRESENT INVENTION

The present invention is a disengage mechanism associated with a pivotally mounted and rear row vehicle seat. In particular, the present invention teaches a two-way linearly displaceable disengagement mechanism for use with a rear row seat and which facilitates selective forward tumble and rearward removal, such as through an open hatch, from within a vehicle interior.

The seat includes a seat back pivotally associated with a seat bottom. The mechanism includes a handle-operated actuating assembly mounted to the seat. The assembly includes a pivotally associated lever actuated in at least one of first and second rotational directions.

A translatable plate exhibits a pair of arcuate channels along which are rotatably influenced the pivotally associated lever and by virtue of pins secured to ends of the lever offset from its pivot point and which extend through the arcuate channels. An axial slot defined through the translatable plate facilitates travel of the lever's pivot point concurrent with its arcuate induced pivoting.

A grasping portion extends from the translatable plate and further includes an arcuately extending gripping element secured to said translatable plate at first and second locations. A cross member associated with the gripping element includes first and second pins which seat through channels defined within the support plate and which, in combination with the arcuate channels and the slot supporting the lever pivot point, define a range of motion of the translatable plate.

A seat forward tumble mechanism includes a cable securing to the pivotally associated lever. A corresponding seat disengage mechanism includes at least a second cable securing to the translatable plate at a second location. The assembly is actuated in a selected direction, such as inwardly to accomplish forward tumbling of the seat back and seat bottom, or rearwardly in order to both tumble and disengage the seat from the floor for removal.

BRIEF DESCRIPTION OF THE DRAWINGS

Reference will now be made to the attached drawings, when read in combination with the following detailed description, wherein like reference numerals refer to like parts throughout the several views, and in which:

FIG. 1 is a plan view of a rear row seat in an engaged position within a vehicle interior and further illustrating the push/pull plate secured to an underside frame location of the seat according to the present invention;

FIG. 2 is a succeeding plan view of the vehicle seat illustrated in FIG. 1 and showing the plate in a push condition, whereby forward tumble of the associated seatback and pivoting of the seat bottom about a forward floor-mounted axis is created;

DETAILED DESCRIPTION OF THE PREFERRED EMBODIMENTS

Figure 4:
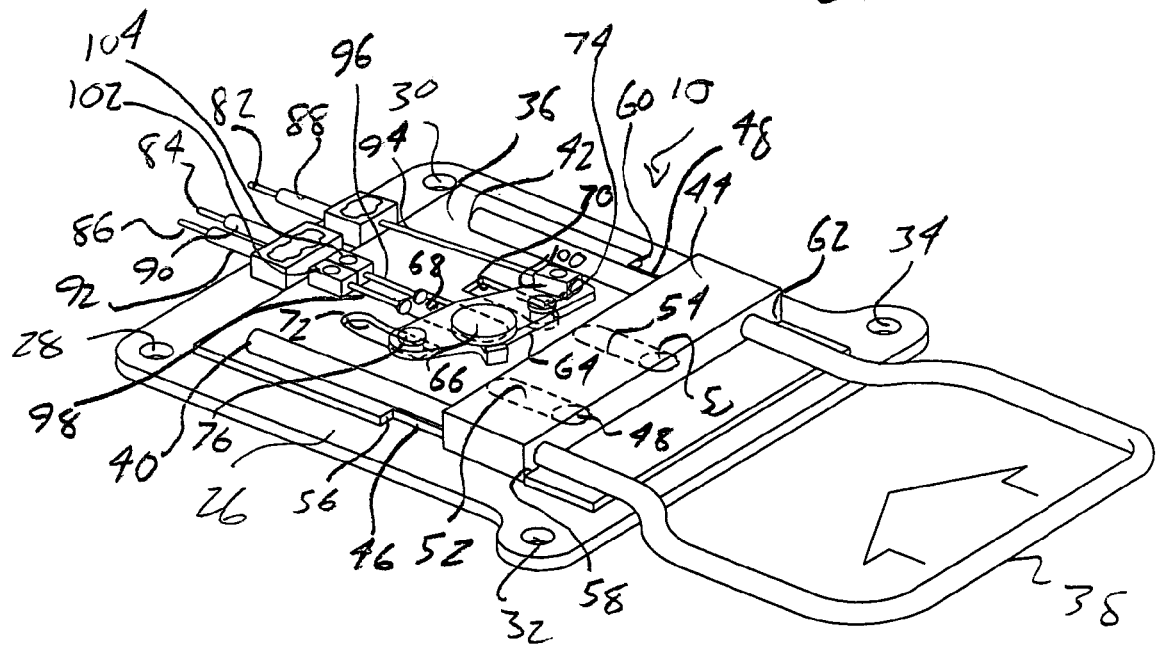
FIG. 4 is a perspective view of the disengagement mechanism according to the present invention and illustrated in a push condition corresponding generally to the environmental illustration of the seat in FIG. 2.

Referring now to FIG. 1 in cooperation with FIG. 4, a disengage mechanism is illustrated 10 for use with a floor-mounted, forwardly pivotal and removable vehicle seat. As described previously, the present invention discloses a disengage and release mechanism particularly suited for a rear row vehicle seat (such as in particular a third row seat) and which facilitates removal of the vehicle seat from a rear open location of the vehicle.

The seat, as best illustrated in FIG. 1, includes a frame supported seat bottom 12 and a pivotally associated seat back 14 secured to the seat bottom by hinged side brackets 16. The seat bottom 12 is further connected to the vehicle floor 17 via front locating brackets 18, which define a forward rotating floor located axis, as well as rearwardly positioned floor latch mechanisms, see as at 20, for securing the seat to the vehicle floor 17 in a locked position.

Figure 3:
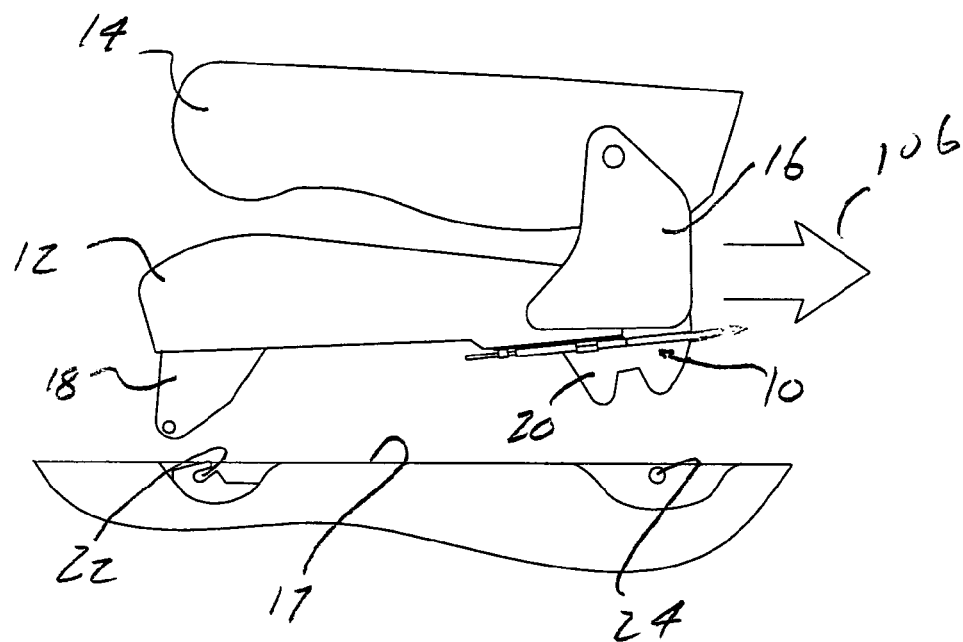
FIG. 3 is further succeeding plan view of the vehicle seat and in a pull actuated and removal condition, and whereby the seat is released from the vehicle along its floor-mounted axis concurrent with forward tumbling of the seatback.

As best further shown in FIG. 3, the floor mounting structure for securing the seat includes a front mounted seating location 22 for securing the front mounting brackets 18 of the seat, as well as a rear mounted striker 24 which is engaged by the latch mechanism 20. While the environmental illustrations of FIGS. 1-3 are illustrated in plan view, it is further understood that suitable front and rear brackets are situated on both sides of the seat.

Figure 5:
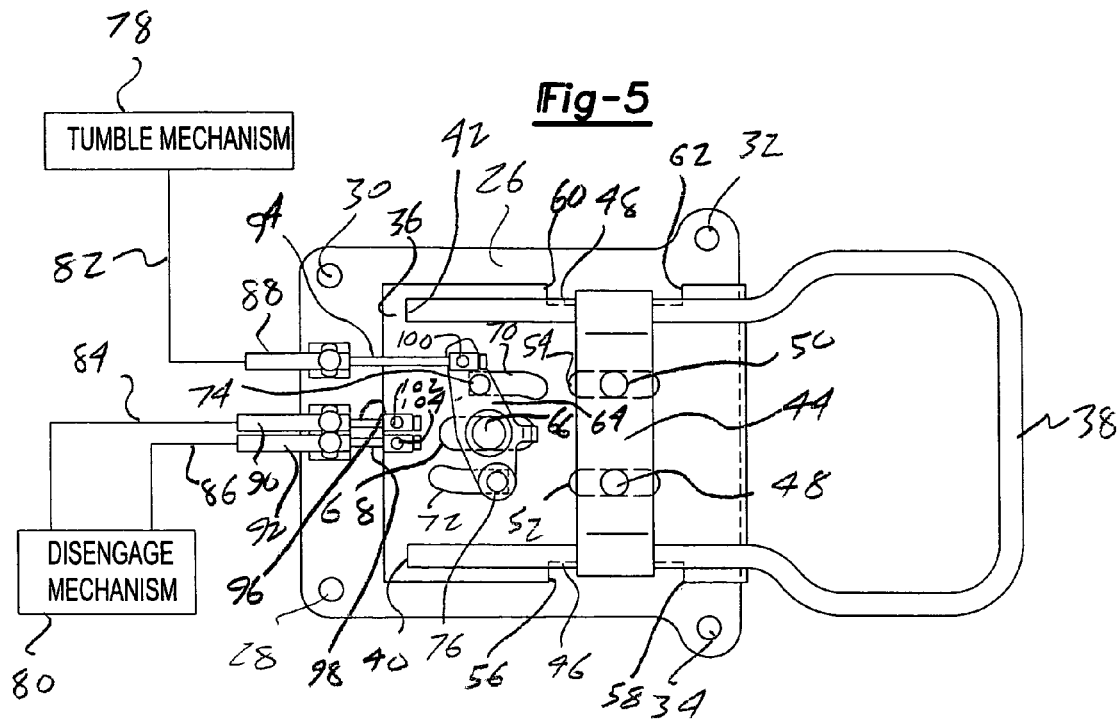
FIG. 5 is plan view of the disengagement mechanism of FIG. 4 in a neutral position, corresponding generally to the engaged position of the seat and seat back in FIG. 1.

Referring again to FIGS. 1-3, in cooperation with FIGS. 4 and 5, the disengage mechanism 10 includes a substantially flattened and supporting plate 26 which is secured to an underside rear of the seat bottom 12, and typically in relation to the supporting frame associated with the seat bottom. A plurality of holes 28, 30, 32 and 34 correspond to mounting locations for securing the plate 26 to the underside location of the seat bottom frame, it being further understood that the support plate 26 can be mounted in any of a number of different locations associated with the vehicle seat and floor according to the present invention.

A handle-operated actuating assembly includes a translatable plate 36 secured in adhering surface fashion to the support plate 26, and from which extends an arcuate grasping portion 38. The grasping portion 38 includes an arcuately extending gripping element secured to the translatable plate 26 at first 40 and second 42 locations.

In a preferred variant, a three-dimensional cross member 44 is associated with the gripping element, including side apertures through which extend the associated sides of the grasping portion 38, the cross member 44 seating within recessed side channels 46 and 48 extending a determined lengthwise distance along the translatable plate 26. The cross member 44 is secured in fixed fashion upon the support plate 26 and permits the translatable plate 36 to traverse relative thereto.

The cross member 44 further includes first and second downwardly projecting pins, see at 48 and 50 in each of FIGS. 4-7, and which seat through aligning and corresponding slot-shaped channels 52 and 54 defined within the translatable plate 36. A range of slidable motion, in either of inner or outer displaced directions, is thereby established between the translatable plate 36 and the fixed support plate 26, and as defined by opposing pairs of shoulders 56 and 58 and 60 and 62 defined on outermost side edges of the cross member 44 and between which the recessed side channels 46 and 48 respectively extend.

A pivotally associated and somewhat elongated lever is illustrated at 64 in each of FIGS. 4-7 and which is supported in pivoting fashion about a fixed pin 66 extending from the supporting plate 26. A linear shaped channel 68 is defined in the translatable plate, through which the fixed lever support pin 66 extends and which, in cooperation with the side recesses 46 and 48 in the cross member 44, assist in defining the range of translation of the plate 36 relative to the fixed plate 26.

First and second arcuate channels 70 and 72 extend along locations formed in the translatable plate 36, and are offset on opposite sides from the pivot pin seated through the linear shaped channel 68. Received within the side walls associated with each of the arcuate channels are first and second pins 74 and 76, and which in turn are mounted in freely rotatable fashion to first and second pivot offset locations associated with the lever. As will be subsequently described, the arrangement and configuration of the arcuate channels 70 and 72, combined with the location of the pins 74 and 76, result in the lever 64 being rotated in a clockwise direction, regardless of the grasping element 38 actuating the translatable plate 36 in either a push or pull fashion relative to the fixed plate 26.

Referring again to FIG. 5, a seat tumble mechanism is diagrammatically illustrated at 78, a seat disengage mechanism further being referenced at 80. The seat tumble and seat disengagement mechanisms are, by themselves, generally known in the relevant art and do not require additional description or illustration beyond stating that the tumble mechanism operates to forwardly tilt the seat back 14 relative to the seat bottom 12, see as referenced at 14' in FIG. 1, and to then release the seat latch mechanism 20 from its associated striker bar 22 to permit the seat to successively pivot about the front location 22. The seat disengagement mechanism 80 successively operates, as illustrated again in FIG. 3, to release the seat from its front location and to permit the seat to be removed, such as through the rear, from the vehicle.

Referring to FIG. 5, a first cable associated with the tumble mechanism is generally represented at 82, a pair of second cables are likewise generally represented at 84 and 86 and which extend from the seat disengage mechanism. Each of the cables associated with the seat forward tumble mechanism and seat disengage mechanism further include an outer sheath portion, see at 88, 90 and 92, respectively, fixed to the support plate 26. Rigid and translatable wires extending from a projecting open end of each of the fixed outer sheath portions 88, 90 and 92 and are shown at 94, 96 and 98 respectively.

The inner translatable wire 94 associated with the forward seat tumble cable 82 secures to the lever 64 at a location 100 offset from its pivotal connection. The pair of inner translating rigid wires 96 and 98, associated with outer sheath portions 90 and 92 belonging to the seat disengage mechanism, include enlarged head portions which abut against locations 102 and 104 secured along an edge of the translatable plate 36.

In operation, the handle-operated actuating assembly is depressed inwardly, against the seat to engage the forward tumble mechanism only. This is as represented in sectional illustration in FIGS. 4 and 7 and corresponds with the travel of the lever supported pins 74 and 76 along the arcuate channels 70 and 72, such that the lever is pivoted in the clockwise direction to actuate the inner translating portion 94 of tumble mechanism cable 82. At the same time, the pins 48 and 50 associated with the cross member 44 seat against end edges of the associated linear channels 52 and 54, while the corresponding linear channel 68 establishes end abutting contact with the lever supporting pivot pin 66.

Concurrently, the inner translating portions 96 and 98 of cables 84 and 86 are caused to freely translate (project) through inner sleeves associated with the fixed locations 102 and 104 and in order that the disengage mechanism remains non-actuated. In this fashion, the seat is caused to tumble forward only (see again as shown at 105 in FIG. 2).

Figure 6:
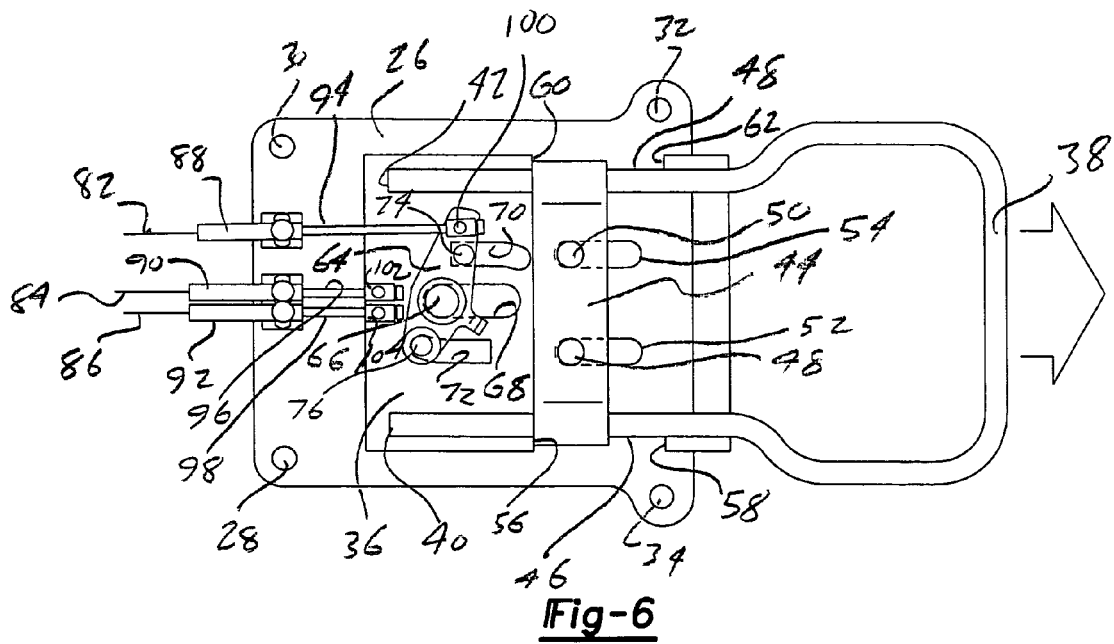
FIG. 6 is a plan view of the disengagement mechanism in a fully pull-actuated condition represented by the seat position of FIG. 3.
Figure 7:
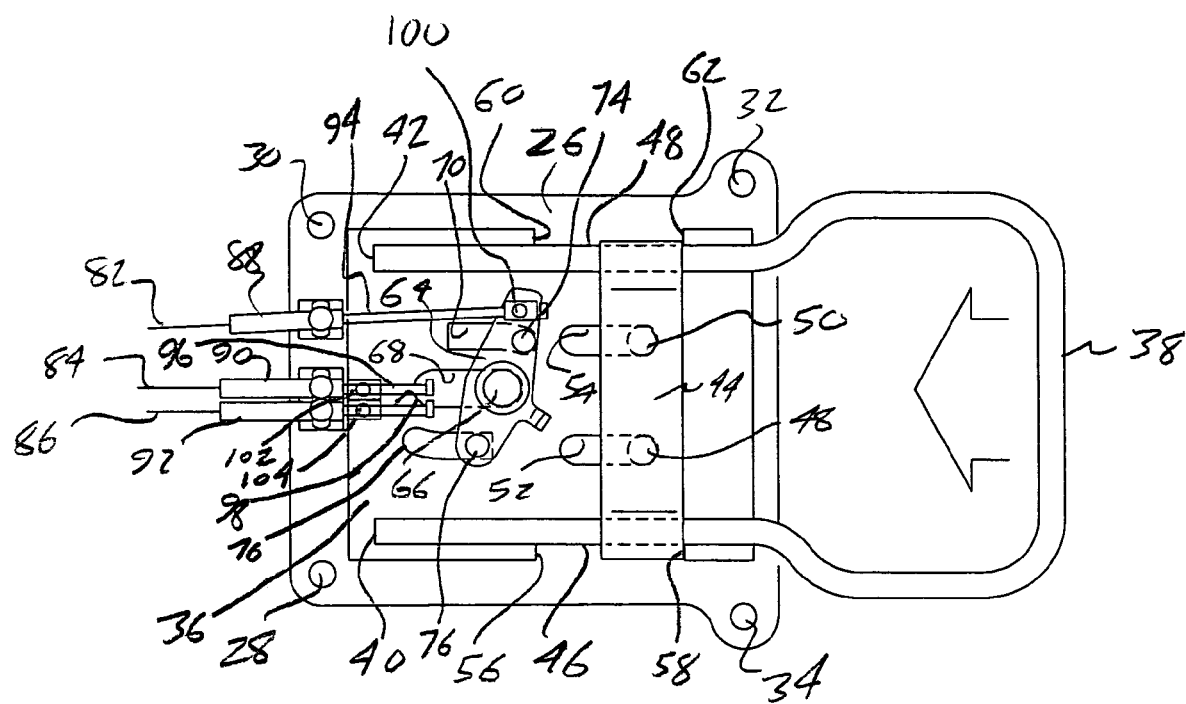
FIG. 7 is a plan view of the disengagement mechanism in a fully push-actuated condition represented by the plan view illustration of FIG. 4 and the seat position of FIG. 2.

In an alternate operation, and upon being pulled outwardly away from the seat in the manner illustrated in FIG. 6, the shaping of the arcuate channels 70 and 72, combined with the arrangement of the lever actuating pins 74 and 76, again causes the lever 64 to rotate in a clockwise direction (again despite the translatable plate being moved outwardly as opposed to inwardly relative the seat). Concurrently, enlarged cap or head portions associated with the inner translating portions 96 and 98 of cables 84 and 86 are in this event caused to abut against the fixed locations 102 and 104, and in order that the translating portions 96 and 98 are caused to travel along with the translatable plate.

Thus, the disengage mechanism is caused to be actuated, resulting in the seat being disengaging from the vehicle floor concurrent with the forward tumble mechanism being actuated (see again FIG. 3). At this point, the seat may be removed in the manner referenced by the directional arrow 106 in FIG. 3.

Having described our invention, other and additional preferred embodiments will become apparent to those skilled in the art to which it pertains and without deviating from the scope of the appended claims.

We claim:

1. A disengage mechanism incorporated into a floor-mounted, forwardly pivotal and removable seat, said mechanism comprising:
   a handle operated actuating assembly mounted to the seat, said handle operated actuating assembly further comprising:
      a pivotally associated lever actuated in at least one of first and second rotational directions;
      a translatable plate which has at least one arcuate channel along said pivotally associated lever which is rotatably influenced and
      a grasping portion extending from said translatable plate;
   a seat forward tumble mechanism including a cable securing to said assembly at a first location; and
   a seat disengage mechanism including at least a second cable securing to said assembly at a second location;
   said assembly being actuated in a selected direction to accomplish at least one of forward tumbling and disengagement of said seat from the floor.

2. The mechanism as described in claim 1, the seat including a seat back pivotally associated with a seat bottom, said forward tumble mechanism further comprising rotating the seat back relative the seat bottom, concurrent with forwardly pivoting the seat relative to the floor.

3. The mechanism as described in claim 1, further comprising a support plate fixedly secured to an underside location of the seat and guiding said translatable plate in first and second directions.

4. The mechanism as described in claim 3, each of said cables associated with said seat forward tumble mechanism and said seat disengage mechanism further comprising an outer sheath portion fixed to said support plate, rigid and translatable wires extending from each of said outer sheath portions.

5. The mechanism as described in claim 4, further comprising an inner translatable wire associated with said forward seat tumble cable and securing to said lever at a location offset from its pivotal connection.

6. The mechanism as described in claim 5, further comprising a pair of inner translating rigid wires associated with outer sheath portions belonging to said seat disengage mechanism, said pair of rigid wires securing to locations along said translatable plate.

7. The mechanism as described in claim 3, said grasping portion further comprising an arcuately extending gripping element secured to said translatable plate at first and second locations, a cross member associated with said gripping element including first and second pins which seat through channels defined within said translatable plate and which, in combination with said arcuate channel, define a range of motion of said translatable plate.

8. The mechanism as described in claim 1, further comprising a linear shaped channel defined in said translatable plate and for allowing a degree of travel of said plate, relative to said pivotally associated lever, and along said arcuate channel.

9. The mechanism as described in claim 8, said at least one arcuate channel further comprising first and second arcuate channels extending along locations formed in said translatable plate offset from said linear shaped channel, first and second pins extending through said arcuate channels and mounting to first and second locations associated with said lever.

10. The mechanism as described in claim 1, said handle-operated actuating assembly further comprising a specified shape and size and being depressed inwardly against said seat to engage said forward tumble mechanism.

11. The mechanism as described in claim 1, said handle-operated actuating assembly further comprising a specified shape and size and being pulled outwardly away from said seat to concurrently actuate said forward tumble mechanism and seat disengagement mechanism.

12. The mechanism as described in claim 11, said seat disengagement mechanism further comprising first and second cables successively actuated to release the seat from a forward pivoting location associated with the floor.

13. A disengage mechanism incorporated into a floor-mounted, forwardly pivotal and removable seat, the seat including a seat back pivotally associated with a seat bottom, said mechanism comprising:
   a handle-operated actuating assembly mounted to the seat, said assembly comprising a pivotally associated lever actuated in at least one of first and second rotational directions, a translatable plate which has at least one arcuate channel along said pivotally associated lever which is rotatably influence, and a grasping portion extending from said translatable plate;
   a seat forward tumble mechanism including a cable securing to said pivotally associated lever; and a seat disengage mechanism including at least a second cable securing to said translatable plate at a second location;

said assembly being actuated in a selected direction to accomplish at least one of forward tumbling and disengagement of said seat from the floor.

14. The mechanism as described in claim 13, further comprising a support plate fixedly secured to an underside location of the seat and guiding said translatable plate in first and second directions.

15. The mechanism as described in claim 14, further comprising first and second arcuate channels extending along locations formed in said translatable plate offset from a linear shaped channel through which a pivot point associated with said lever extends, first and second pins extending through said arcuate channels and mounting to first and second locations associated with said lever.

16. The mechanism as described in claim 14, each of said cables associated with said seat forward tumble mechanism and said seat disengage mechanism further comprising an outer sheath portion fixed to said support plate, rigid and translatable wires extending from each of said outer sheath portions.

17. The mechanism as described in claim 16, further comprising a first wire associated with said seat forward tumble mechanism securing to said lever at a location offset from its pivotal connection, at least one wire associated with said seat disengage mechanism securing to a location along said translatable plate.

18. A disengage mechanism incorporated into a floor-mounted, forwardly pivotal and removable seat including a bottom and a pivotally associated back, said mechanism comprising:

a handle-operated actuating assembly mounted to an underside of the seat bottom, said handle-operated actuating assembly further comprising a pivotally associated lever actuated in at least one of first and second rotational directions;

a seat forward tumble mechanism including a cable securing to said assembly at a first location and including an inner translatable wire securing to said lever at a location offset from its pivotal connection; and a seat disengage mechanism including at least a second cable securing to said assembly at a second location and including at least one additional inner translatable wire securing to a translatable plate associated with said disengage mechanism and which rotatably influences said pivotally associated lever;

said assembly being actuated in a first selected direction to engage said forward tumble mechanism, said assembly being actuated in a second reverse direction to concurrently engage said forward tumble mechanism and said seat disengagement mechanism.

* * * * *

UNITED STATES PATENT AND TRADEMARK OFFICE
Certificate

Patent No. 7,270,375 B2                                                          Patented: September 18, 2007

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Tavis S. Lutzka, Clawson, MI (US); Keith Brantley, Utica, MI (US); and Charles Lynn Hites, Fraser, MI (US).

Signed and Sealed this Third Day of March 2009.

DAVID DUNN
*Supervisory Patent Examiner*
Art Unit 3636